United States Patent [19]
Hayashi

[11] Patent Number: 4,783,064
[45] Date of Patent: Nov. 8, 1988

[54] CARD FEEDING MECHANISM

[75] Inventor: Hiroshi Hayashi, Sakado, Japan

[73] Assignee: Nippon Coinco Co., Ltd., Tokyo, Japan

[21] Appl. No.: 26,821

[22] Filed: Mar. 17, 1987

[51] Int. Cl.$^4$ ............................................. B65H 3/24
[52] U.S. Cl. ................................................... 271/131
[58] Field of Search ......................... 271/131, 133–138

[56] References Cited

U.S. PATENT DOCUMENTS

| | | | |
|---|---|---|---|
| 1,634,074 | 6/1927 | Labombarde | 271/134 |
| 1,644,695 | 10/1927 | Sieg | 271/135 |
| 1,940,487 | 12/1933 | Campbell | 271/138 |
| 4,181,298 | 1/1980 | Capdeboscq | 271/132 X |
| 4,344,611 | 8/1982 | Morita | 271/135 X |
| 4,592,634 | 6/1986 | Koch | 271/137 X |

*Primary Examiner*—Richard A. Schacher
*Attorney, Agent, or Firm*—Bruce L. Adams; Van C. Wilks

[57] ABSTRACT

A card feeding mechanism utilizes a slider supported for reciprocating movement on a reference surface positioned below a card stack and a picker carried on the slider and operatively engaged with an edge of the lowermost card of the card stack to feed only the lowermost card as the slider moves. The picker is composed of a rigid and hard material withstanding a wear and formed in its surface with a slot extending in a direction at right angles to the moving direction of the slider and bordered by opposed front and rear slot edges. The rear slot is arranged at a higher position than the front slot edge to define a step between the slot edges. The step has a height determined in accordance with a thickness of the card so that the step can be engaged with the edge of the lowermost card.

10 Claims, 3 Drawing Sheets

CARD FEEDING MECHANISM

FIELD OF THE INVENTION

The present invention relates to card feeding mechanisms for feeding the lowermost card of a card stack, and particularly to an improvement in a reciprocating picker member which operatively engages the bottom of the card stack.

DESCRIPTION OF PIROR ART

U.S. Pat. No. 3,583,699 issued June 8, 1971 entitled "CARD FEEDING MECHANSISM AND KNIFE THEREOF" has proposed a picker knife which is suitable for contact with an edge of the lowermost card to move only the lowermost card in order to sequentially feeds cards from the bottom of a card stack. This picker knife comprises a blade formed from a stamped sheet metal attached to a torsionally flexible handle portion, the blade being formed with a raised picker edge in engagement with an edge of the lowermost card of a card stack. According to this proposal, since the handle portion has a torsional flexibility, when the card stack is placed on the upper surface of the picker knife, the picker edge receives strain of the card and is positively mated with the edge of the lowermost card. However, in the combination of the torsionally flexible handle portion and the stamped sheet metal blade, the picker edge tends to be disengaged or escaped from a fixed card edge, and therefore, a feed error is liable to occur. Besides, it tends to be easily damaged, and the picker edge on the blade cannot withstand a wear resulting from a prolonged operation.

SUMMARY OF THE INVENTION

It is an object of the present invention to provide a card feeding mechanism provided with a reciprocating picker member which is formed of a rigid material and having a special contour which is suitable for positive contact with an edge of the lowermost card of a card stack to move only the lowermost card.

It is another object of the present invention to provide a card feeding mechanism so designed that a picker member is reciprocated under the state wherein the picker member is resiliently urged against a reference surface in order to prevent disengagement between the picker member and card due to the vibration in a guide path of the picker member or due to a play resulting from an error in manufacture when the picker member causes a fixed card to move.

For achieving the aforementioned objects, the characteristic of the present invention resides in a card feeding mechanism comprising a slider mounted for reciprocating movement on a reference surface positioned below a card stack, and a picker carried on the slider and operatively engaged with an edge of the lowermost card of the card stack to feed only the lowermost card as the slider moves, the picker being formed of a rigid and hard material withstanding a wear, the picker having in its surface a slot extending in a direction at right angles to the moving direction of the slider, one of opposed edges between which is sandwiched the slot being arranged at a higher position than the other edge whereby a step at a level determined relative to a thickness of the card is defined between both the edges, the step being adapted to engage the edge of the lowermost card.

According to a preferred embodiment of the present invention, there is further provided means for resiliently urging the slider against the reference surface, whereby an unexpected and undesirable movement of the picker may be restrained to prevent the edge of the card from being disengaged from the step of the picker.

DESCRIPTION OF THE PREFERRED EMBODIMENTS

Figure 1:
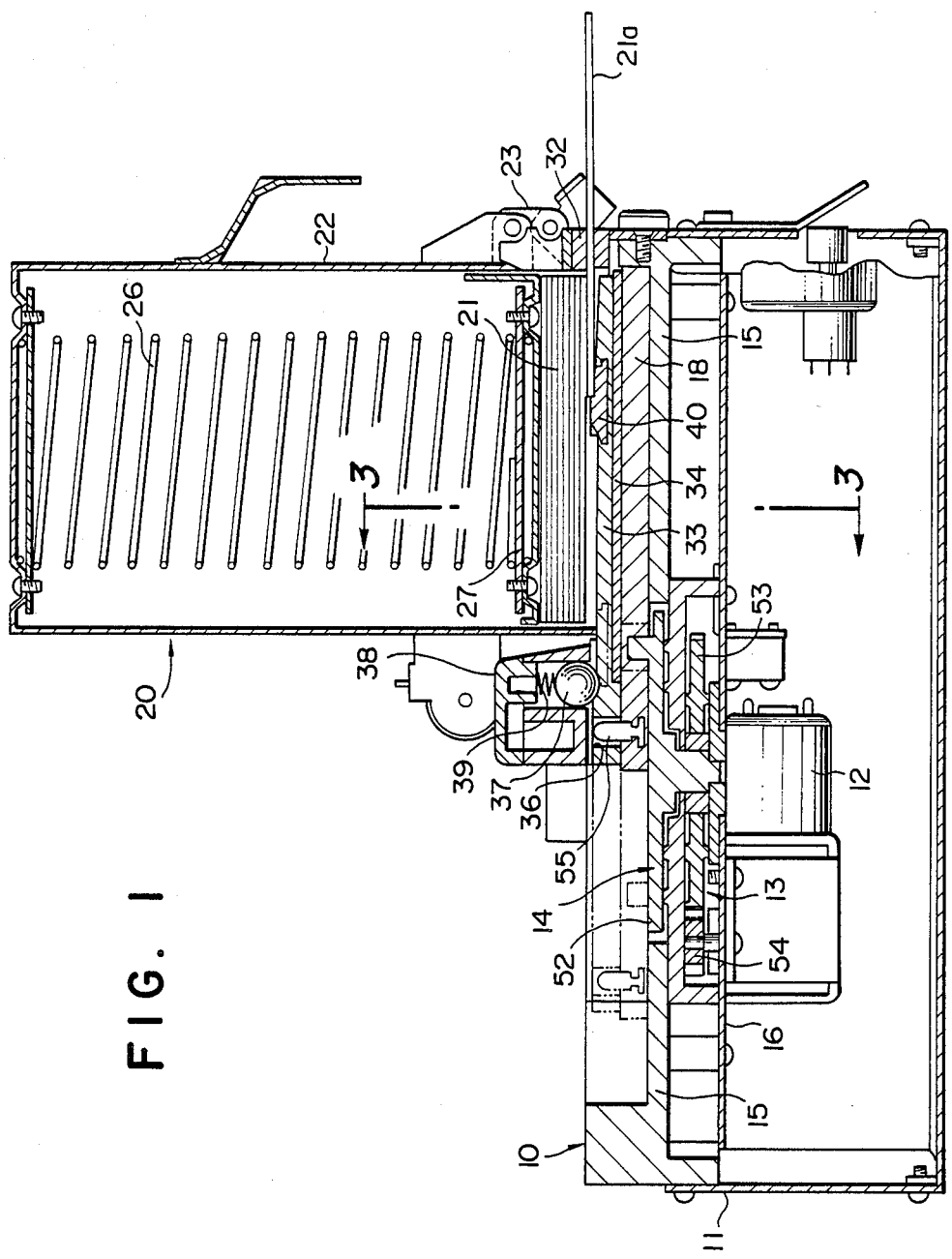
FIG. 1 is a sectional view of a card feeding mechanism according to the present invention.
Figure 3:
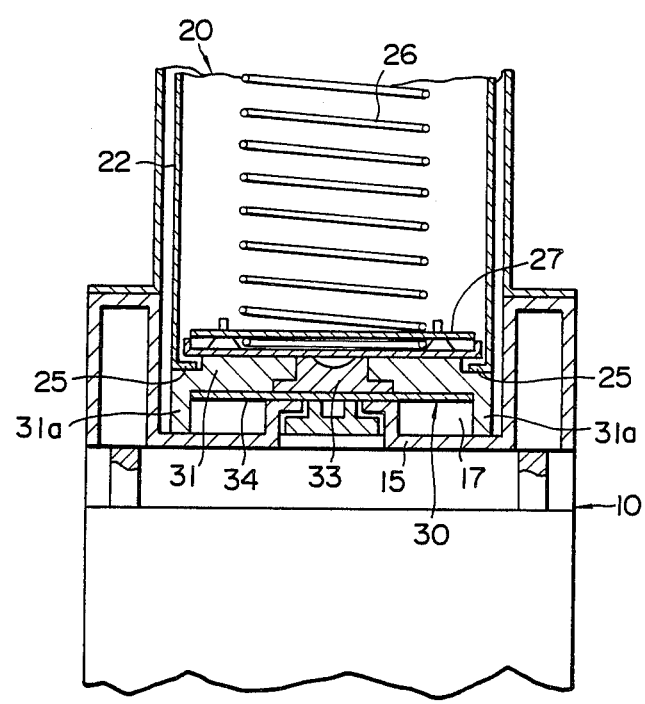
FIG. 3 is a sectional view taken along line 3—3 of FIG. 1.

Referring now to FIGS. 1 and 3, a card feeding mechanism according to the present invention comprises a drive mechanism part generally indicated at reference numeral 10 and a card storing and feeding mechanism part 20 detachably mounted on the drive mechanism part 10. The card storing and feeding mechanism part 20 comprises a box or container 22 for storing a card stack 21 and a card feeding mechanism 30 including a bottom plate 31 pivotably supported by a hinge 23 (right-hand in FIG. 1) provided below the box 22. Provided on both sides of the lower end of the box 22 are a pair of flanges 25 (FIG. 3) formed so that they are extended laterally towards each other, the bottom plate 31 being arranged between the flanges 25. The box 22 is interiorly provided with a pressure plate 27 connected to a coil spring 26 for biasing the card stack 21 towards the bottom plate 31.

The card feeding mechanism 30 has a gate member 32 defining a narrow slit which allows a passage of only the lowermost card 21a of the card stack 21 within the card box 22 between the lower end of the card box 22 and the bottom plate 31. This gate member 32 is formed of a hard and rigid material, for example, sintered metal, which can withstand friction with frequently passing cards. A slider 33 having a picker 40 is mounted for reciprocating movement on the bottom plate 31 so that only the lowermost card 21a of the card stack 21 is moved towards the gate member 32. This slider 33 is received in a dovetail groove formed in the center of the bottom plate 31, as best shown in FIG. 3, and is slidably retained by a cover plate 34 secured to the bottom plate 31, while the slider 33 extends in the feeding direction of the card as best shown in FIG. 1 and has the picker 40 carried on the upper portion thereof. The picker 40 will be described later in detail but the picker contacts the rear edge of the lowermost card 21a of the card stack 21 to move the card 21a towards the gate 32 as the slider 33 reciprocates.

The drive mechanism part 10 has a housing 11, within which is provided an electric motor 12, a gear reducer 13 and a motion converting mechanism 14. The housing 11 includes a base plate 15 and a mounting plate 16, the mounting plate 16 supporting thereon the electric motor 12 and the gear reducer 13, the base plate 15 supporting thereon the known crank-cross slider type motion converting mechanism 14. Referring to FIG. 3, on the base plate 15 is placed the card feeding mechanism 30 including the bottom plate 31 integral with the cover plate 34. In this case, the bottom plate 31 has legs 31a on opposite sides thereof, and a gap 17 is formed between the bottom plate 31 and the base plate 15. On the other hand, referring to FIG. 2 together with FIG. 1, a cross slider 18 of the aforementioned crank-cross slider type motion mechanism 14 is arranged in the gap 17 between the base plate 15 and the bottom plate 31. This cross slider 18 is supported slidably in the feeding direction of the card by means of a pair of guide ribs 19 formed on the base plate 15.

Figure 2:
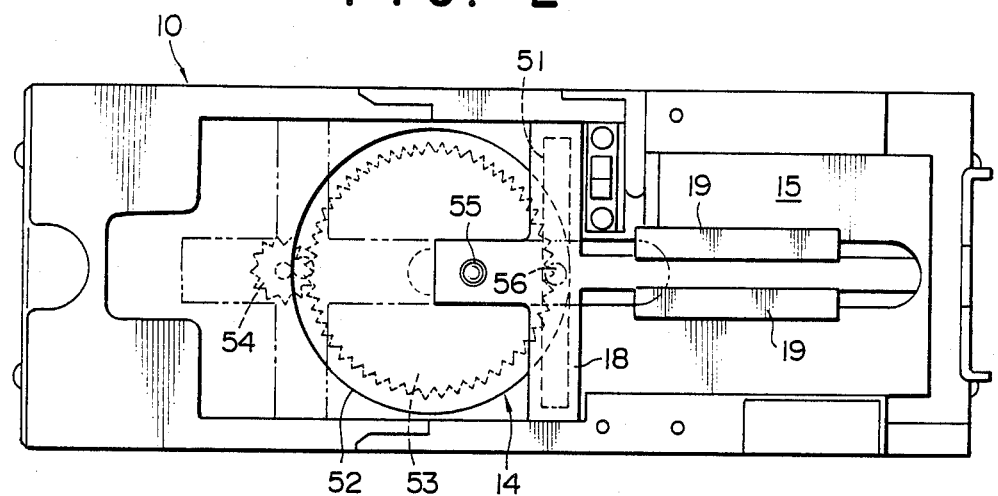
FIG. 2 is a plan view of a drive mechanism part of the mechanism shown in FIG. 1 with a card box portion removed therefrom.

Although the crank-cross slider type motion converting mechanism 14 will not be described in detail since it is known, the cross slider 18 is formed crosswise as best shown in FIG. 2, and has a groove 51 extending in a direction at right angles to the sliding direction thereof, and a pin 56 of a crank disc 52 is in engagement with the groove 51. The crank disc 52 is fixed coaxially with a large diameter gear 53 of the gear reducer 13 and rotatably supported on the base plate 15 together with the large diameter gear 53. The large diameter gear 53 is meshed with a small diameter gear 54 connected to the electric motor 12. The cross slider 18 has a connection pin 55, which is in turn engaged with a hole 36 formed in the picker slider 33. When the crank disc 52 is rotated through the gear reducer 13 as the motor starts, the picker slider 33 is moved along with the cross slider 18, whereby the picker 40 feeds out only the lowermost card 21a of the card stack 21 from the gate 32.

Figure 4:
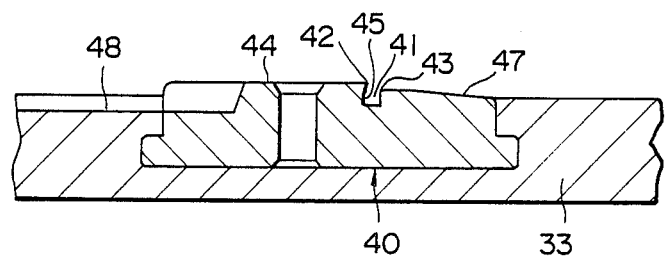
FIG. 4 is a sectional view of a picker member prepared in accordance with a concept of the present invention.
Figure 5:
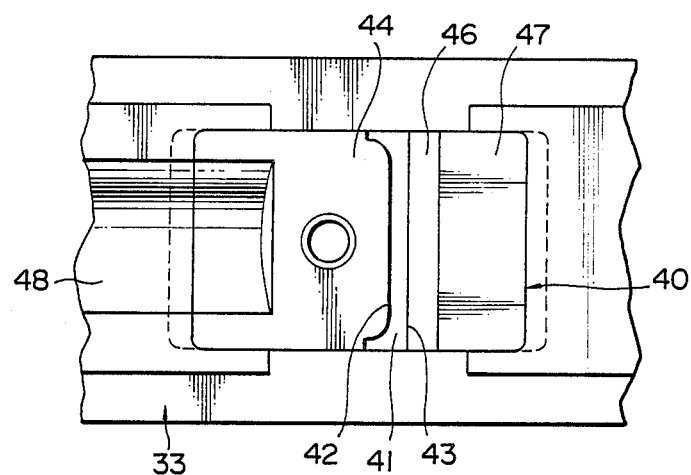
FIG. 5 is a plan view of the picker member shown in FIG. 4.

Referring now to FIGS. 4 and 5, the picker 40 is firmly secured to the picker slider 33, the picker 40 being formed of a rigid sintered metal and having a fine shape as will be described hereinafter. That is, the picker 40 has in its upper surface a transverse slot 41 extending in a direction at right angles to the feeding direction of card, and a step which is equal to a thickness of or slightly lower than the card 21a is formed between one edge 42 and the other edge 43 which are opposed to each other with respect to the slot 41 sandwiched therebetween. In this case, the one edge 42 which occupies a rearward position relative to the other edge 43 as viewed from the card stack 21 is positioned at a level higher than the other front edge 43. A rear upper surface 44 of the picker 40 extends horizontally and rearwardly from the edge 44 adjacent to the rear edge 42. One side wall 45 within the slot 41 defining the edge 42 distributed at the high position is preferably formed with overhung portion of the order of 5 degrees with respect to an imaginary vertical surface whereby preventing the edge or thickness part of the lowermost card 21a of the card stack 21 from overriding the step. Especially important characteristic is that since the step is formed adjacent to the slot 41, satisfactory engagement between the card edge and the step is not impaired by remaining of abrasive powder or dust of cards resulting from a long-period use. The picker upper front surface extending adjacent to the other edge 43 distributed at the lower position is comprised of a horizontal surface 46 extending forwardly from the edge 43 and an inclined surface 47 subsequent to the horizontal surface 46 and inclined downwardly in the forward direction. Although most portion of the picker 40 is embedded into the slider 33, the picker upper surface is protruded and the upper surface of the slider 33 is mated or contiguous with the lowest portion of the inclined surface 47 of the picker 40.

The picker slider 33 is formed with a shallow groove 48 which has a circular cross section along the lengthwise thereof, and a spherical member 37 (FIG. 1) resiliently and downwardly urged is engaged with the groove 48. This spherical member 37 is mounted within a bracket 38 provided on the bottom plate 31 of the card feeding mechanism 30 and is subjected to biasing force of a spring 39. Since the picker slider 33 is urged towards the base plate 15 through the cover plate 34 wherever the position thereof is due to the resilient biasing force caused by the spherical member 37 in engagement with the groove 48 in the slider 33, stabilized movement is assured even against the vibration resulting from the reciprocating motion or the play due to the error in maufacture, thereby positively preventing the card edge from disengagement or escape from the step in the picker 40.

What is claimed is:

1. A card feeding mechanism comprising: a container for storing therein a stack of cards; a slider supported to undergo reciprocating movement on a reference surface positioned below the card stack; and a picker carried on the slider and operatively engaged with an edge of the lowermost card of the card stack to feed only the lowermost card as the slider moves, said picker being formed of a rigid and hard material capable of withstanding wear, said picker having in its surface a slot extending in a direction at a right angle to the moving direction of the slider, one of two slot edges which are opposed to each other relative to the slot being arranged at a higher position than the other slot edge to define a step at a level determined relative to a thickness of the card such that the step is adapted to engage with the edge of the lowermost card, said picker having a first horizontal surface extending adjacent to said one slot edge, a second horizontal surface extending adajcent to the other slot edge, and an inclined surface adjacent to the second horizontal surface.

2. A card feeding mechanism as claimed in claim 1; wherein one side wall of the slot extending downwardly from said one slot edge is overhung relative to an imaginary vertical surface.

3. A card feeding mechanism as claimed in claim 1; wherein said picker is composed of sintered metal.

4. A card feeding mechanism as claimed in claim 1; including biasing means for resiliently biasing the slider against the reference surface.

5. A card feeding mechanism as claimed in claim 4; wherein said biasing means includes an elongated groove formed in the slider and extending in the moving direction of the slider, and a resiliently urged spherical member in engagement with the groove.

6. A card feeding apparatus comprising: a container having a bottom plate for supporting thereon a stack of cards and a slit opening aligned with an upper surface of the bottom plate; a slider mounted in the bottom plate upper surface to undergo reciprocating movement in forward and rearward moving directions; a picker embedded in the slider for movement therewith and protruding upwardly from an upper surface of the slider such that the picker can engage with a thickness part of the lowermost card when the slider is driven in the forward moving direction to thereby feed the lowermost card from the slit opening, the picker having an upper surface, a transverse slot formed in the picker upper surface and extending transversely of the moving direction, and front and rear edges bordering the transverse slot on the picker upper surface and being spaced apart from each other in the moving direction, the rear edge having a height greater than that of the front edge with respect to the slider upper surface by an amount corresponding to the thickness of the card such that the rear edge can be brought into engagement with the thickness part of the lowermost card when the picker is moved in the forward moving direction, the picker upper surface having a rear horizontal section extending rearwardly from the rear edge, a front horizontal section extending forwardly from the front edge and a front inclined section extending from the front horizontal section and inclined downwardly in the forward direction such that the front inclined section is contiguous to the slider upper surface along the front border between the slider and embedded picker; and drive means connected to the slider for reciprocatingly driving the slider.

7. A card feeding apparatus as claimed in claim 6; wherein the picker has a transverse wall portion extending downwardly from the rear edge and inclined rearwardly for receiving thereon the thickness part of the lowermost card.

8. A card feeding apparatus as claimed in claim 6; wherein the picker is composed of a sintered metal.

9. A card feeding apparatus as claimed in claim 6; including urging means for resiliently downwardly urging the slider against the bottom plate.

10. A card feeding apparatus as claimed in claim 9; wherein the urging means includes an elongated groove formed in the slider and extending in the moving direction and a spherical member disposed in sliding engagement with the groove and resiliently biased downwardly.

* * * * *